(12) United States Patent
Maguire et al.

(10) Patent No.: US 10,057,404 B2
(45) Date of Patent: *Aug. 21, 2018

(54) TECHNIQUES FOR MOBILE DEVICE PERSONALIZATION

(71) Applicant: Facebook, Inc., Menlo Park, CA (US)

(72) Inventors: Yael Maguire, Boston, MA (US); Fraidun Akhi, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,683

(22) Filed: Oct. 17, 2017

(65) Prior Publication Data

US 2018/0041627 A1 Feb. 8, 2018

Related U.S. Application Data

(63) Continuation of application No. 15/186,714, filed on Jun. 20, 2016, which is a continuation of application No. 14/310,037, filed on Jun. 20, 2014, now Pat. No. 9,392,103.

(60) Provisional application No. 61/877,671, filed on Sep. 13, 2013.

(51) Int. Cl.
H04M 3/16 (2006.01)
H04M 1/725 (2006.01)
H04W 8/20 (2009.01)
H04W 4/00 (2018.01)
H04L 29/08 (2006.01)
H04W 12/06 (2009.01)
H04W 4/50 (2018.01)
H04W 4/80 (2018.01)
H04W 84/12 (2009.01)

(52) U.S. Cl.
CPC ...... *H04M 1/72563* (2013.01); *H04L 67/306* (2013.01); *H04W 4/001* (2013.01); *H04W 4/008* (2013.01); *H04W 4/50* (2018.02); *H04W 4/80* (2018.02); *H04W 8/205* (2013.01); *H04W 12/06* (2013.01); *H04M 2250/04* (2013.01); *H04W 84/12* (2013.01)

(58) Field of Classification Search
CPC ......... H04M 1/72563; H04M 2250/04; H04W 4/008; H04W 12/06; H04W 4/001; H04W 8/205; H04W 84/12; H04L 67/306
USPC ..... 455/411, 41.2; 340/10.51, 636.1, 539.11, 340/573.1
See application file for complete search history.

(56) References Cited

U.S. PATENT DOCUMENTS 9,392,103 B2 * 7/2016 Maguire ........... H04M 1/72563
2009/0307140 A1 * 12/2009 Mardikar ........... G06Q 20/1085
705/71

* cited by examiner

Primary Examiner — Amancio Gonzalez

(57) ABSTRACT

Techniques for mobile device personalization are described. In an embodiment, user credentials for an online service are received at a mobile device kiosk. The user credentials may be authenticated and, upon authentication, user data associated with the user credentials may be transferred to a mobile device of the mobile device kiosk. The user data may be transferred between the mobile device kiosk and a wireless transmitter embedded on a printed circuit board (PCB) of the mobile device. Further, the user data may be transferred to the mobile device without powering on the mobile device. Once the data transfer is complete, the mobile device may be provided to a user.

20 Claims, 11 Drawing Sheets

TECHNIQUES FOR MOBILE DEVICE PERSONALIZATION

CROSS-REFERENCE TO RELATED APPLICATIONS

This application is a continuation of, claims the benefit of and priority to, previously filed U.S. patent application Ser. No. 15/186,714, filed Jun. 20, 2016, titled "TECHNIQUES FOR MOBILE DEVICE PERSONALIZATION" which is a continuation of previously filed U.S. patent application Ser. No. 14/310,037, filed Jun. 20, 2014, titled "Techniques for Mobile Device Personalization," which is now U.S. Pat. No. 9,392,103, which claims the benefit of priority under 35 U.S.C. § 119(e) to U.S. Provisional Application No. 61/877,671, filed Sep. 13, 2013, all of which are incorporated herein by reference in their entirety.

BACKGROUND

A mobile device, such as a mobile telephone, may be manufactured and assembled in a factory overseas or in a facility in the United States. Most mobile devices are not built-to-order and, thus, are placed into inventory until each individual unit is purchased by a customer. Devices may be in transit or sit in inventory for days, weeks, or months prior to purchase. Typically, a mobile device spends more time in transit to a storage facility, store, or other holding area, such as a vending machine, than the standby battery life of the device. Thus, devices may be charged and turned off prior to leaving the factory. Since devices may be powered off after leaving the factory, a need exists for a technique to update information within the device prior to providing a purchased device to a customer.

SUMMARY

The following presents a simplified summary in order to provide a basic understanding of some novel embodiments described herein. This summary is not an extensive overview, and it is not intended to identify critical elements or to delineate the scope thereof. Its sole purpose is to present some concepts in a simplified form as a prelude to the more detailed description that is presented later.

Various embodiments are generally directed to techniques for mobile device personalization. Some embodiments are particularly directed to techniques for mobile device personalization in a social networking environment such that a user's mobile device may be pre-loaded with credentials for a social network prior to delivery to the user. In this manner, profile information for the user may be retrieved by the mobile device prior to initialization of the mobile device.

In an embodiment, a radio-frequency identification module may be used within the device to communicate customer information to a memory of the device prior to delivery of the device to a customer. Customers may purchase devices online, from a store, or from a vending machine or kiosk. As such, customer information may be entered prior to purchase. Customer information may include payment information, credentials for a social networking site, or other account information for an online service. Prior to delivery of a mobile device, customer information may be used to access other data related to the customer, such as a authentication data for a user account, profile photo, other photos, contact information for members of a social graph, login information for one or more services, browsing history, bookmarks, preferences, advertising data, or provisioning information for a device. In this manner, information may be preloaded to a device, and upon receiving a power-on operation after delivery, the preloaded information may be used to personalize the device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
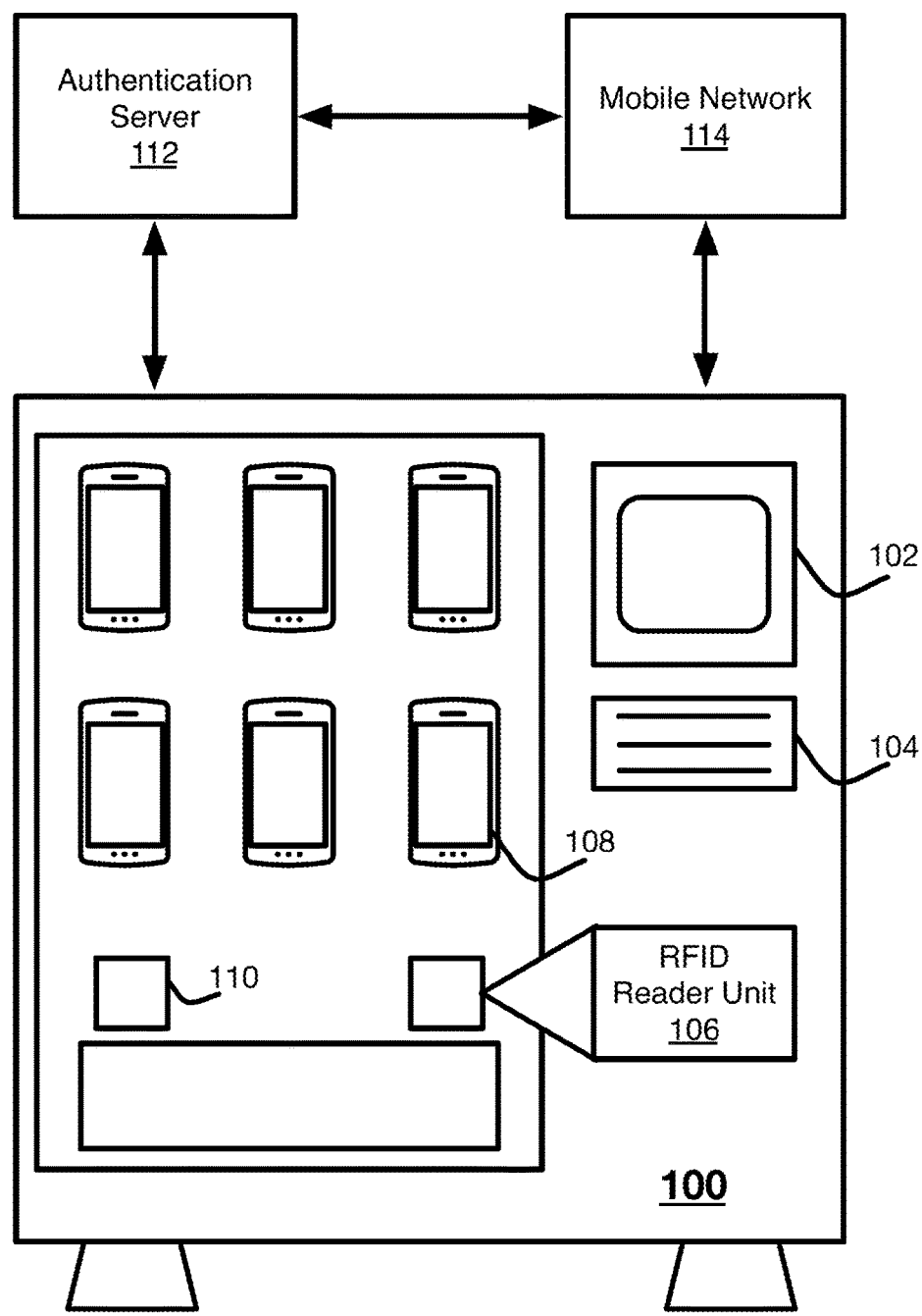
FIG. 1 illustrates an embodiment of a vending system.

Various embodiments are generally directed to techniques for the personalization of mobile devices in a social networking environment. Some embodiments are particularly directed to techniques for mobile device personalization in a social networking environment such that a user's mobile device may be pre-loaded personalized information prior to delivery to the user. In this manner, information related to the user may be retrieved by the mobile device prior to initialization of the mobile device.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates one embodiment of mobile device kiosk 100. Kiosk 100 may be a vending machine, or other retail unit included within a store, on the street, or placed in an airport or shopping mall, for example. Further, the functionality disclosed with respect to kiosk 100 may optionally be incorporated into other facilities, such as a manufacturing facility or point-of-sale system within a retail environment. Kiosk 100 may include one or more electronic devices and network connections, as described further herein. For example, kiosk 100 may be connected to one or more networks using a communication framework, such as that illustrated within FIG. 9, described further herein. In addition, kiosk 100 may include one or more devices, such as that illustrated within FIG. 8, described further herein.

Kiosk 100 may be connected, either using a wired or wireless connection, to an authentication server 112 and a mobile network 114. Authentication server 112 may be associated with an online service, such as a social network, wireless provider, device retailer, or other entity that may authenticate user credentials supplied to kiosk 100. In an embodiment, authentication server 112 may communicate with mobile network 114. Mobile network 114 may be a wireless network and include one or more nodes of a wireless carrier, such as any of those described further herein, and may be accessed to supply provisioning information, such as subscriber identify module (SIM) information, account information, billing information, or user data, to mobile devices within kiosk 100. In one example, mobile network 114 may provide virtual SIM information to a mobile device 108. Virtual SIM information may include a software profile which mimics a physical SIM card, complete with an international mobile subscriber identity number (IMSI) and authentication code, in some embodiments. In addition, virtual SIM information may include other SIM card features such as phone contacts, or other additional custom features. In this manner, a mobile device 108 purchased by a user may be updated, either prior to delivery to the user or upon powering on the device, with information necessary to connect to a mobile network 114.

Kiosk 100 may include mobile devices 108, which may include any electronic device capable of receiving, processing, and sending information for the disclosed embodiments. Examples of an electronic device may include without limitation a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, consumer electronics, programmable consumer electronics, game devices, television, digital television, set top box, or combination thereof. The embodiments are not limited in this context.

In an embodiment, kiosk 100 may include a display device 102, which may be any type of display device known in the art, such as, but not limited to, a LCD, LED, CRT, AMOLED, or other display and may also include a touch screen, whether resistive or capacitive. Input device 104 may be coupled or integrated into display 102 as a touch screen, making a single component. Further, input device 104 may constitute a separate component, such as a touch screen display, keyboard with mouse, or other input device known in the art. Further, input device may include one or more wireless transmitters, such as RFID, Bluetooth, or NFC, and may be configured to accept data from a mobile device using such transmitters. In an example, a mobile device may send user credentials or purchasing information via a wireless connection to input device 104 to initiate a purchase of one or more of mobile devices 108.

A user of kiosk 100 may use display device 102 and/or input device 104 to select a mobile device 108 for purchase. In addition, a user may input credentials or purchasing information. User credentials may include username, password, email address, or other identifying information. Purchasing information may include credit card information, mobile payment information, virtual currency information, or other payment information necessary to make a purchase. Kiosk 100 may use received purchasing information to authorize payment of a mobile device 108. Further, kiosk 100, using a network connection to authentication server 112, may authenticate the user credentials, and access information related to the user from a social network or other service. Information related to the user may include authentication data for a user account, profile photo, other photos, contact information for members of a social graph, login information for one or more services, browsing history, bookmarks, preferences, or advertising data. Information related to the user may be stored locally within kiosk 100 and subsequently transferred using RFID reader unit 106 to a selected mobile device 108, as described below.

In an embodiment, kiosk 100 may include RFID reader unit 106. RFID reader unit may be any radio frequency identification transmission and reception device capable of sending or receiving data to a compatible RFID device. For example, RFID reader unit 106 may communicate over ultra-high frequency (UHF) bands, typically between 300 MHz and 3 GHz (3,000 MHz). Of course, other radio frequency bands may be used. In addition, RFID reader unit 106 may be replaced with a wireless module that operates using other wireless protocols, such as near-field communication (NFC), Wi-Fi, Wi-Fi Direct, or a wired connection such as USB. In any event, RFID reader unit 106 may be used to transmit data related to a customer to a mobile device 108. During such a transfer, mobile device 108 may not need to be powered on, as the data transfer takes place using power provided by RFID reader unit 106, for example. Data may be transferred to a corresponding RFID module contained within mobile 108, and data may be stored in a non-volatile memory (NVM), or other memory device, within mobile device 108.

In an embodiment, a user may take a mobile device that is already owned to a kiosk, such as kiosk 100 equipped with RFID reader unit 106. RFID reader unit 106 may be configured to accept user data from a user's current device using a local data connection, store the user information in a memory unit of kiosk 100 (not shown), and transfer the user data to a new mobile device 108. In this manner, a user may perform a device upgrade using kiosk 100 using only a local data connection, and may avoid potentially expensive or time consuming data costs associated with reprogramming a new device via a network data connection.

In an embodiment, kiosk 100 may include a connectivity module 110, which may be a wired Ethernet connection module, wireless module supporting cellular and/or Wi-Fi connection, or other module compatible with any of the communications techniques described herein. Connectivity module 110 may be used by kiosk 100 to update product information, inventory information, prices of products, or to communicate information about a user with one or more network-based services, such as authentication server 112 and mobile network 114, for example.

In an embodiment, information about a mobile device 108, such as a serial number or IMEI number, may be transmitted via connectivity module to either authentication server 112, mobile network 114, or both, and the information may be authenticated. Information about a mobile device may be transmitted along with user credential information. Thus, a mobile device 108 may be authenticated along with received user credentials. For example, user credentials may be used to authenticate a user and device information may be used to authenticate a device with a wireless carrier. Authentication may include verifying a state of a mobile device, such as determining whether the mobile device is stolen by accessing records at a wireless carrier registering stolen devices. Authentication may further include determining whether a version of software on a mobile device is compatible with a network or future network operation.

Once authentication is complete, a device purchase procedure may take place with a mobile operator using mobile network 114. In an embodiment, a mobile operator may send instructions to kiosk 100 indicating that a user's credentials have been authenticated and that mobile device may be purchased by the user. For example, a user may need to qualify for an upgrade, or an account may need to be in good standing, to purchase a mobile device 108. In some embodiments, payment methods may be used for the purchase of a mobile device or virtual SIM. Payment methods may include, but are not limited to, credits from a social network, web service, application store, carrier network, or credit card information. Once a user has been approved to purchase a device, a mobile operator, via mobile network 114, may provide a VS IM, which may be used to provision a mobile device 108 for the user's account. As described herein, additional data may then be populated in mobile device 108.

Figure 2:
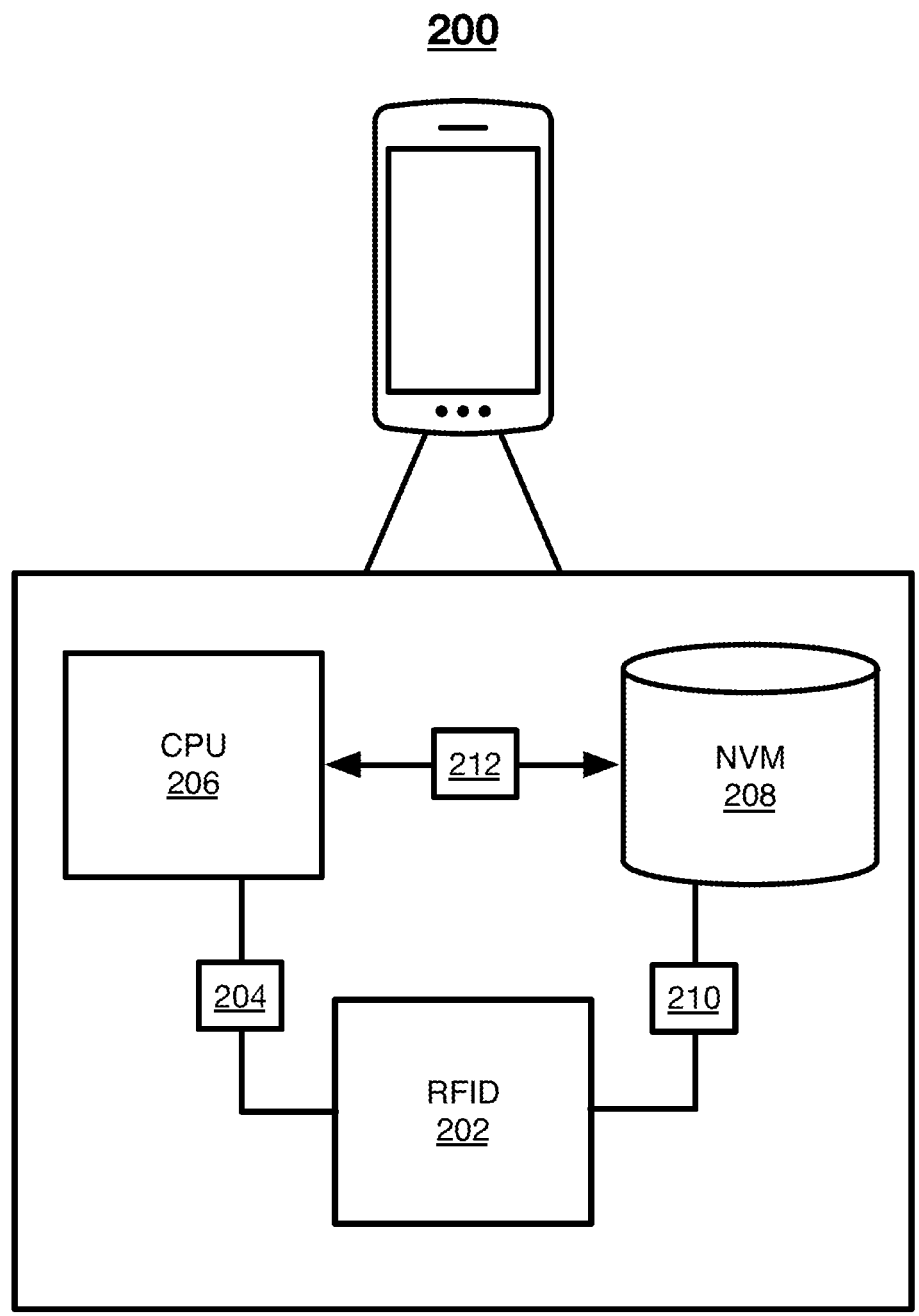
FIG. 2 illustrates an embodiment of a mobile device.

FIG. 2 illustrates an embodiment of a mobile device 200, which may correspond to mobile device 108, described above. Mobile device 200, which may be similar to that described herein with respect to FIG. 6, may include a CPU 206, which may be connected to a NVM 208. As described above, mobile device 200 may be sold to customers using a vending machine, online, or within a physical retail location. After manufacture, but before delivery to a customer, mobile device 200 may receive information about a customer using a RFID reader unit, such as RFID reader unit 106, described above.

In an embodiment, mobile device 200 may include RFID module 202. RFID module 202 may be any radio frequency identification transmission and reception device capable of sending or receiving data to another compatible RFID device. For example, RFID module 202 may communicate over ultra-high frequency (UHF) bands, typically between 300 MHz and 3 GHz (3,000 MHz). The use of UHF frequency bands may allow the transfer of data through product packaging, for example. Of course, other radio frequency bands may be used. In addition, RFID module 202 may be replaced with another type of wireless module utilizing other protocols, such as near-field communication (NFC) or Wi-Fi, for example. In any event, RFID module 202 may be used to receive data related to a customer for storage in mobile device 200. During such a transfer, mobile device 200 may not need to be powered on, as the data transfer takes place using power provided by a RFID reader unit, such as RFID reader unit 106, for example. Received data may be stored in a non-volatile memory, or other memory device, within mobile device 200, such as NVM 208. For example, RFID module 202 may directly communicate received data to NVM 208 via bus 210, which may be an inter-integrated circuit (I2C) bus, or other communication bus described herein or otherwise known in the art.

An embodiment may utilize a UHF-based RFID module. With a UHF-based RFID system, the location of the reader may be separated farther from the device, which may simplify or make possible the mechanical design of a vending machine or kiosk. For example, typically in kiosks, products are dropped or shuttled into a staging area for the customer to retrieve. The staging area is usually dependent on the original location of the device. This may make it very difficult for a near-field protocol like NFC (typically with 4 cm read range) to work in this environment. In principle, the RFID reader unit in an enclosed metal kiosk could address the mobile device 200 before it is dispatched. Received data may be stored in a non-volatile memory, or other memory device, within mobile device 200, such as NVM 208.

In some embodiments, mobile device 200 may include an I2C bus 204, connecting RFID module 202 with CPU 206. The use of an I2C bus may allow mobile device 200 to transfer information received at RFID module 202 to NVM 202 without performing a full power-on operation. Of course, other buses and connection techniques may be used to transfer data from RFID module 202 to NVM 208. Upon receipt of data at RFID module 202, a wake command may be sent to CPU 206, which will then temporarily wake up for the purpose of saving data to the NVM. In this manner, mobile device 200 may be left turned off, and may remain turned off while a data transfer takes place using RFID module 202.

Using RFID module 202, information related to a user purchasing mobile device 200 may be transferred to NVM 200. Such information may include authentication data for a user account, profile photo, other photos, contact information for members of a social graph, login information for one or more services, browsing history, bookmarks, preferences, or advertising data.

Figure 3A:
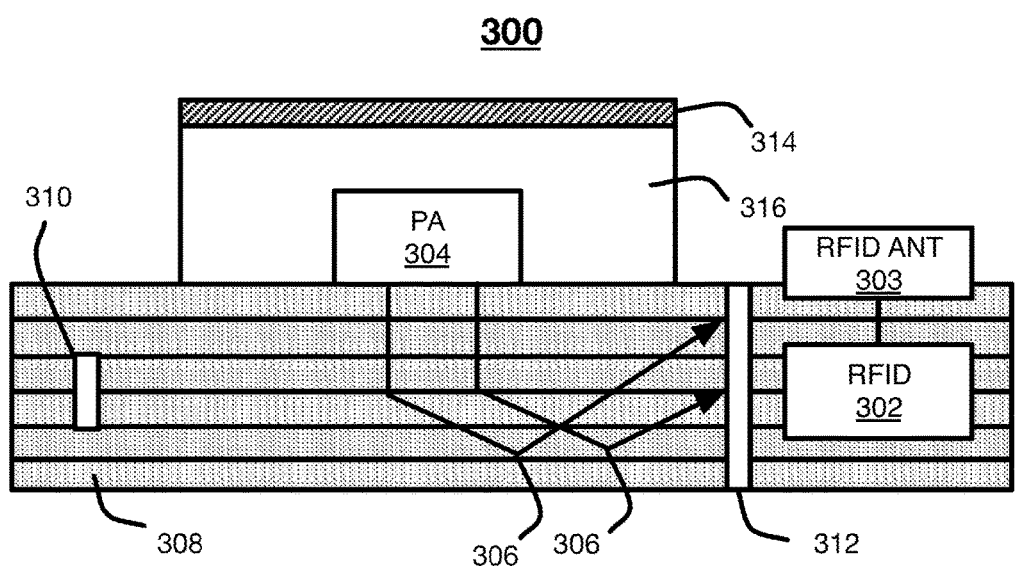
FIG. 3A illustrates an embodiment of a printed circuit board.

FIG. 3A illustrates one embodiment of a printed circuit board (PCB) 300. PCB 300 may include a plurality of components, such as those described above with respect to FIG. 2. For example, PCB 300 may include a processor, one or more memory units, and other electronic components, such as circuit elements. Components of PCB 300 have been limited to those shown for purposes of illustration, and not limitation. PCB 300 may comprise one or more layers, which may be copper sheets laminated onto a non-conductive, dielectric, substrate, for example. As illustrated in FIG. 3A, PCB 300 includes six such layers 308, however, more or less layers may be used.

In an embodiment, PCB 300 may include one more power amplifiers, such as power amplifier 304. Power amplifier 304 may be used to increase the power of a signal, such as a wireless signal in a mobile device, and may be coupled to an antenna of a mobile device, which may be a component of PCB 300 (not shown). The inclusion of an antenna directly on PCB 300 may allow for communication of information from a mobile device kiosk to a mobile device, as discussed in more detail above. In addition, PCB 300 may include RFID module 302 and RFID antenna 303. RFID module 302 may be similar to RFID module 202, described above with respect to FIG. 2. While an RFID module is illustrated, it can be appreciate that any wireless transmission module may be used.

As illustrated within FIG. 3A, interference 306 may be emitted from power amplifier 304. In an example, as power amplifier 304 coverts lower-power radio-frequency signals into larger signals of higher power, interference 306, or noise, may be emitted and may have a negative impact on components within a range. In one example, the performance of RFID module 302 may be negatively impacted by interference 306. Further, interference leaking from a mobile device may be of a level that is unacceptable to regulatory authorities. For this reason, it may be difficult to place wireless modules directly on PCBs due to performance and regulatory requirements.

However, as shown in FIG. 3A, PCB 300 may include one or more vias. Via 310 and via 312 may comprise a path through one or more layers of PCB 300 that provide electrical connections between layers. Some vias, such as via 310, may only connect a small number of layers. Other vias, such as via 312, may be situated in between a source of interference (e.g. power amplifier 304) and a wireless module (RFID module 302) and may provide a connection between many layers, or all layers of PCB 300, and may be referred to as a through-via. As shown, via 312 comprises a hole between all six layers 308 of PCB 300, which may be used for connecting components of the PCB. In an embodiment, the depth of a via may be determined based upon a threshold level of interference, which may be determined by regulatory requirements or performance requirements. The placement of via 312 between a source of interference and a wireless module may provide significantly lower levels of interference 306, thus allowing for placement of a wireless module on PCB 300 without significant interference from power amplifier 304.

In an embodiment, to further limit interference from power amplifier 304, a ferromagnetic layer 314 may be situated above power amplifier 304 and within a power amplifier shield 316. In one embodiment, ferromagnetic layer 314 may be situated on an inner surface of power amplifier shield 316. Ferromagnetic layer 314 may include one or more ferromagnetic materials, which may include a composite of different magnetic and metallic materials that absorb RF energy and may lower the amount of interference emitted by power amplifier 304. In an embodiment, a small layer, such as a 0.1 mm layer, of ferromagnetic material may be used. In this manner, the amount of interference, or noise, emitted outside a mobile device may be reduced. Further, power amplifier shield 316 and ferromagnetic layer 314 may act as a heat conductor and spread heat from the electronic components under the shield. The embodiments are not limited by this example.

Figure 3B:
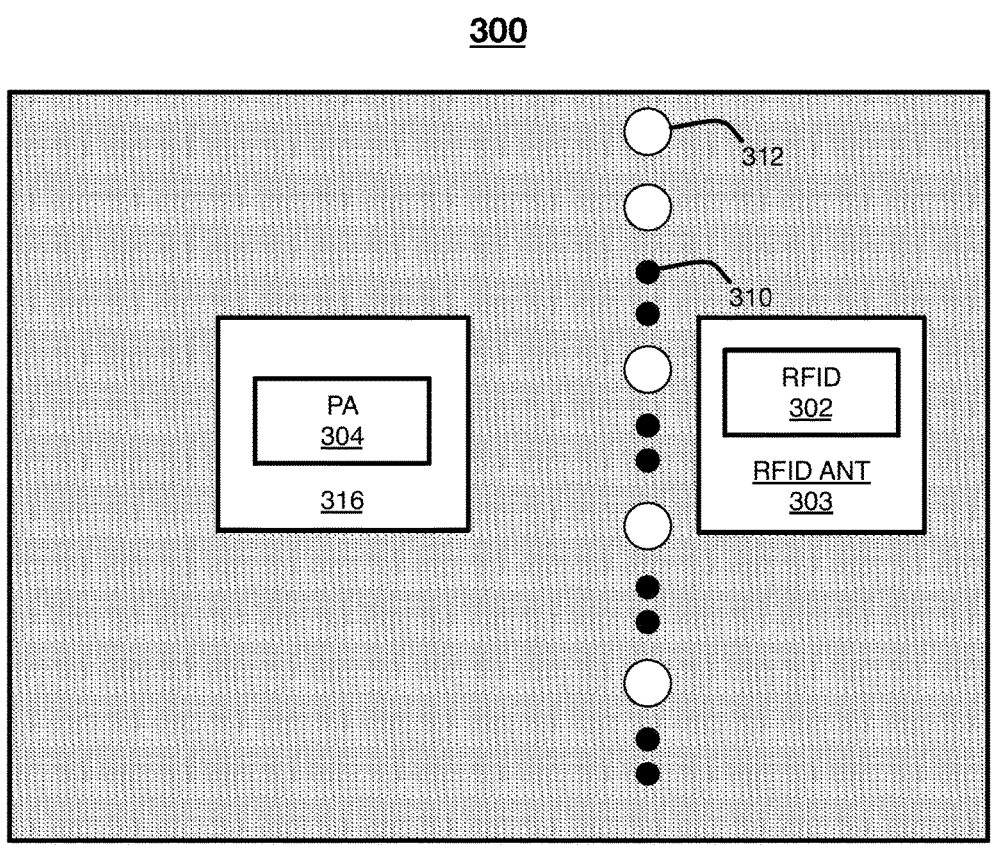
FIG. 3B illustrates an embodiment of a printed circuit board.

FIG. 3B illustrates one embodiment of PCB 300. PCB 300 may include a plurality of components, such as those described above with respect to FIG. 3A. For example, PCB 300 may include a processor, one or more memory units, and other electronic components, such as circuit elements. Components of PCB 300 have been limited to those shown for purposes of illustration, and not limitation. PCB 300 may comprise one or more layers, which may be copper sheets laminated onto a non-conductive substrate, for example. As illustrated in FIG. 3A above, PCB 300 includes six such layers, however, more or less layers may be used.

In FIG. 3B, PCB is illustrated from a top-down view, showing power amplifier 304, power amplifier shield 316 (which may also include ferromagnetic layer 314), RFID module 302, and RFID antenna 303. These elements are shown for purposes of illustration, and not limitation, and it can be appreciated that PCB 300 may include many additional elements. As illustrated, a plurality of vias may be situated between power amplifier 304 and RFID module 302/RFID antenna 303. In an embodiment, two different types of vias may be situated between power amplifier 304 and RFID module 302/RFID antenna 303, however, only a single type of via, or many types of vias may be used based upon particular implementations. In one example, two-layer vias, such as via 310, may be used in combination with though-vias (going through all six layers), such as via 312. While a particular via orientation is illustrated within FIG. 3B, it can be appreciated that other orientations may be used based upon particular implementations. For example, more or less through-vias 312 may be used based upon an amount of interference or noise generated by power amplifier 304, or an amount of interference or noise leakage desired based upon regulatory requirements.

Included herein is a set of flow charts representative of exemplary methodologies for performing novel aspects of the disclosed architecture. While, for purposes of simplicity of explanation, the one or more methodologies shown herein, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
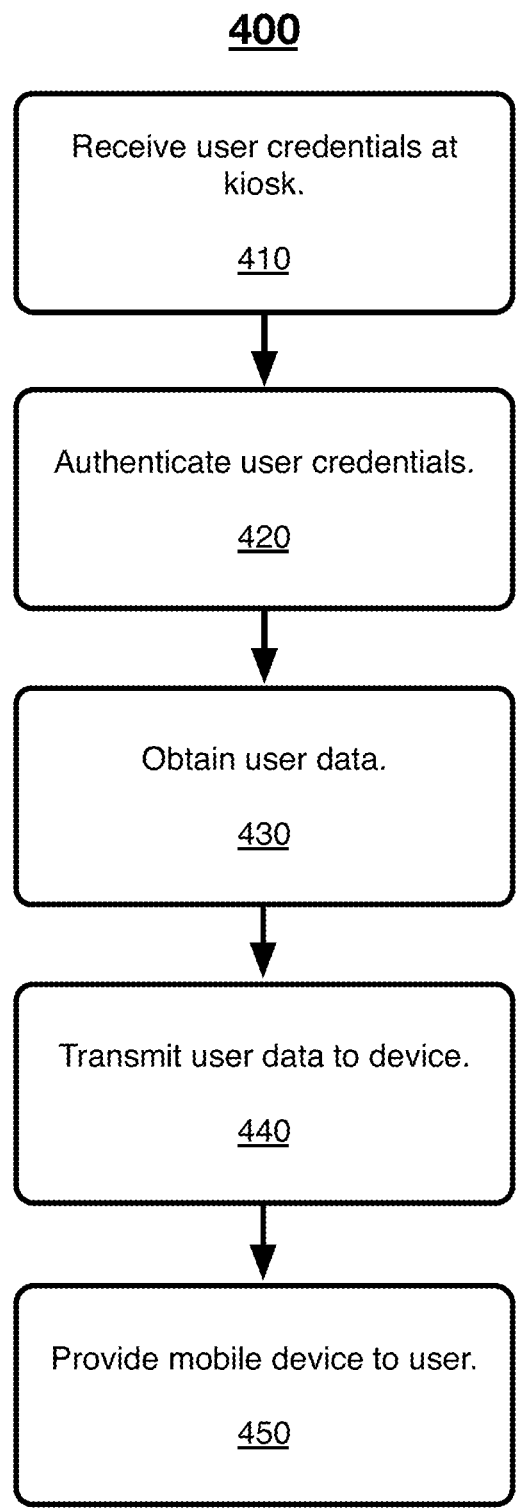
FIG. 4 illustrates an embodiment of a logic flow.

FIG. 4 illustrates one embodiment of a logic flow 400. The logic flow 400 may be representative of some or all of the operations executed by one or more embodiments described herein. For example, logic flow 400 may be performed using the kiosk illustrated within FIG. 1, described above. Logic flow 400 at block 410 may receive credentials or other user information from a user input device at a kiosk, such as a vending machine or point-of-sale terminal within a retail environment. In an embodiment, user credentials or other information may be received via a network, such as the internet, in an online shopping environment. User credentials may be login information, such as the username, email address, or password for a social network or other online service. Further, user credentials may include payment information for the purchase of a mobile device. In an embodiment, mobile device information from one or more mobile devices available for sale, such as a serial number or IMEI number, may also be collected by a kiosk.

In an embodiment, logic flow 400 at block 420 may authenticate received user credentials with an authentication server, such as authentication server 112, discussed above. For example, login information for a social network may be authenticated and a confirmation of authentication may be provided to a kiosk. Likewise, device information may be authenticated with a mobile carrier or other service. Upon authentication, a kiosk may obtain user data from a social network or other service at 430. Such information may include authentication data for a user account, profile photo, other photos, contact information for members of a social graph, login information for one or more services, browsing history, bookmarks, preferences, or advertising data, for example. In addition, in some embodiments, VSIM, or other provisioning information may be obtained from a mobile network.

Logic flow 400 at block 440 may transmit user data and/or provisioning information to a mobile device. For example, a mobile device may be purchased by a user from a vending machine, online store, or retail store. After an intent to purchase, or purchase, has been made by the user, but before delivery of the mobile device to the user, information about the user, as described above, may be transferred to the mobile device. The information may be transferred using corresponding RFID modules in a vending machine and a mobile device, however, in online environments a RFID module may be present in a fulfillment center, or in a retail environment, a RFID module may be present at a point-of-sale terminal. In one embodiment, upon confirmation of authentication, pre-loaded user profile information stored locally at a kiosk may be transmitted to a mobile device. In another embodiment, profile information may be transmitted over a network.

In an embodiment, device information may be used to authenticate and provision a mobile device. For example, user credentials may be used to authenticate a user and device information may be used to authenticate a device with a wireless carrier. Authentication may include verifying a state of a mobile device, such as determining whether the mobile device is stolen by accessing records at a wireless carrier registering stolen devices. Authentication may further include determining whether a version of software on a mobile device is compatible with a network or future network operation. Once authentication is complete, a device purchase procedure may take place with a mobile operator using a mobile network. In an embodiment, a mobile operator may send instructions to a kiosk indicating that a user's credentials have been authenticated and that mobile device may be purchased by the user. For example, a user may need to qualify for an upgrade, or an account may need to be in good standing, to purchase a mobile device. Once a user has been approved to purchase a device, a mobile operator may provide a VSIM or other provisioning information, which may be used to provision a mobile device for the user's account.

Logic flow 400 at block 450 provides the mobile device to a user, with information preloaded into a memory, such as NVM 208, described above.

Figure 5:
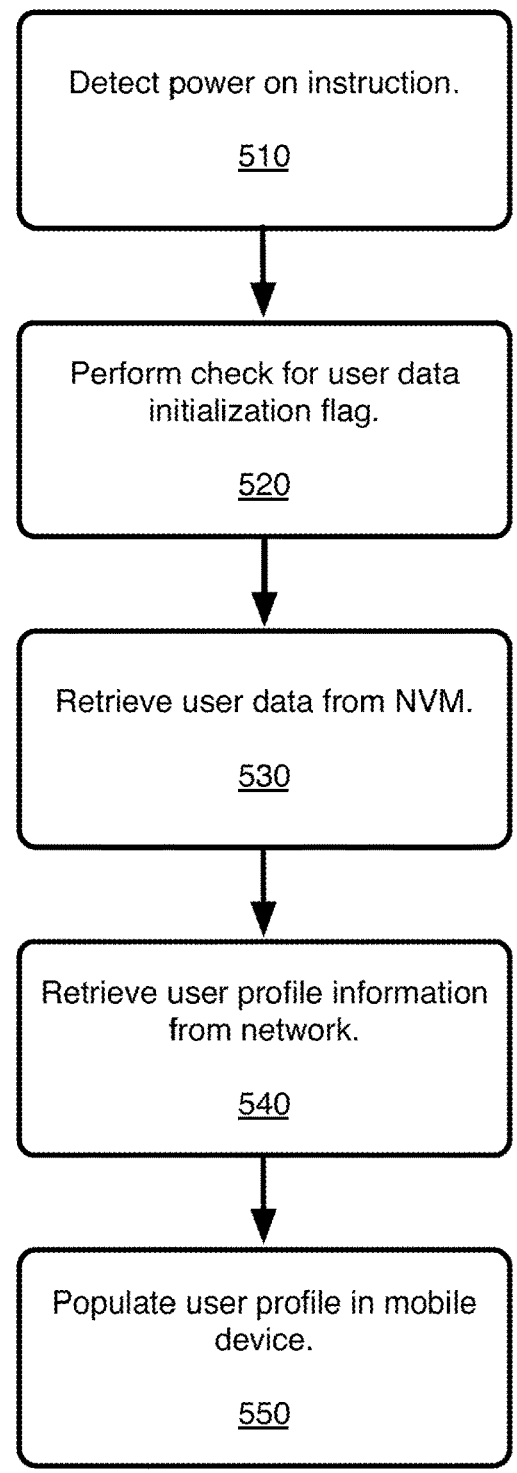
FIG. 5 illustrates an embodiment of a logic flow.

FIG. 5 illustrates one embodiment of a logic flow 500 according to one embodiment. Logic flow 500 may be performed by a mobile device, such as mobile device 200, described above. At block 510 of logic flow 500, a mobile device may detect a power-on instruction. Upon detection, the mobile device may perform one or more device initialization steps, for example.

In an embodiment, logic flow 500 at block 520 may perform a check within a memory, such as a NVM, of a mobile device for a user data initialization flag. Such a flag may be an indication to software that user data has been preloaded onto the device using one of the techniques described herein. Such a check may be performed shortly after a power-on instruction has been detected, and prior to a device being fully powered on for a user. For example, such a check may be performed during a device initialization or setup procedure.

Logic flow 500 at block 530 may retrieve data stored in a NVM of a mobile device. Logic flow 500 at block 530 may use retrieved data stored in the NVM related to the user, such as user credentials for a social networking site, to retrieve further user data. User data may be retrieved over a network connection, such as a cellular or Wi-Fi connection, for example. Certain information about the user or otherwise related to the user, such as authentication data for a user account, profile photo, other photos, contact information for members of a social graph, login information for one or more services, browsing history, bookmarks, preferences, or advertising data, may be retrieved at this time.

Logic flow 500 at block 550 may use the retrieved user information to populate a user profile on the mobile device. This may include setting a user's profile photo on the mobile device, populating contact information from the user's social graph, setting user preferences such as privacy, notifications, advertising, or application-specific preferences, populating bookmarks or browsing history to a browser application of the mobile device, or populating any other information about the user.

Figure 6:
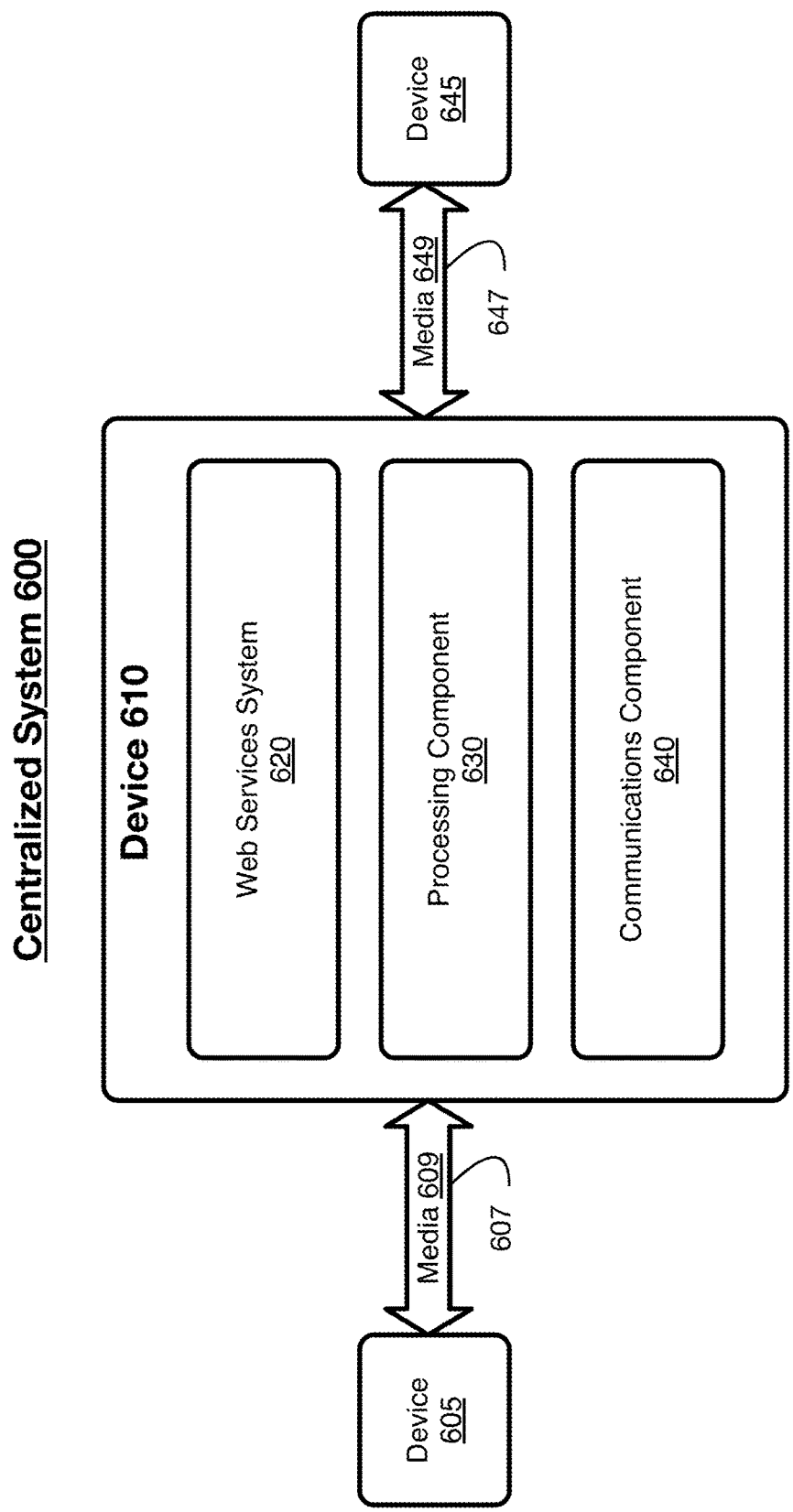
FIG. 6 illustrates an embodiment of a centralized system.

FIG. 6 illustrates a block diagram of a centralized system 600. The centralized system 600 may implement some or all of the structure and/or operations for the disclosed embodiments in a single computing entity, such as entirely within a single device 610.

The device 610 may comprise any electronic device capable of receiving, processing, and sending information for the disclosed embodiments. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 610 may execute processing operations or logic for the disclosed embodiments using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 610 may execute communications operations or logic for the disclosed embodiments using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 609, 649 include wired communications media and wireless communications media. Examples of wired communications media may include a wire, cable, metal leads, printed circuit boards, backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 610 may communicate with other devices 605, 645 over a communications media 609, 649, respectively, using communications signals 607, 647, respectively, via the communications component 640. The devices 605, 645 may be internal or external to the device 610 as desired for a given implementation.

Figure 7:
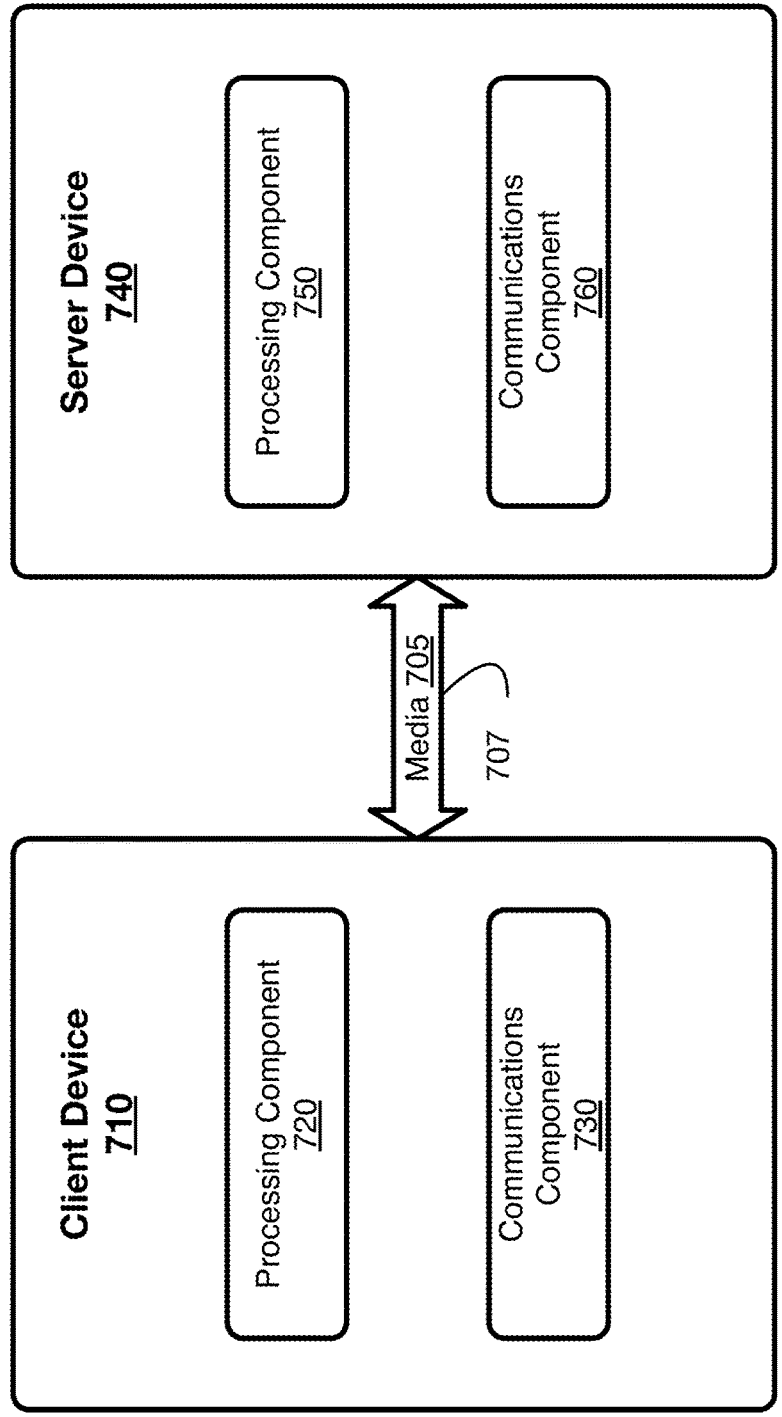
FIG. 7 illustrates an embodiment of a distributed system.

FIG. 7 illustrates a block diagram of a distributed system 700. The distributed system 700 may distribute portions of the structure and/or operations for the disclosed embodiments across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client device 710 and a server device 740. In general, the client device 710 and the server device 740 may be the same or similar to the client device 610 as described with reference to FIG. 6. For instance, the client system 710 and the server system 740 may each comprise a processing component 720, 750 and a communications component 730, 760 which are the same or similar to the processing component 630 and the communications component 640, respectively, as described with reference to FIG. 6. In another example, the devices 710, 740 may communicate over a communications media 705 using communications signals 707 via the communications components 730, 760.

The client device 710 may comprise or employ one or more client programs that operate to perform various methodologies in accordance with the described embodiments. In one embodiment, for example, the client device 710 may implement some steps described with respect to FIGS. 4 and 5.

The server device 740 may comprise or employ one or more server programs that operate to perform various methodologies in accordance with the described embodiments. In one embodiment, for example, the server device 740 may implement some steps described with respect to FIGS. 4 and 5.

Figure 8:
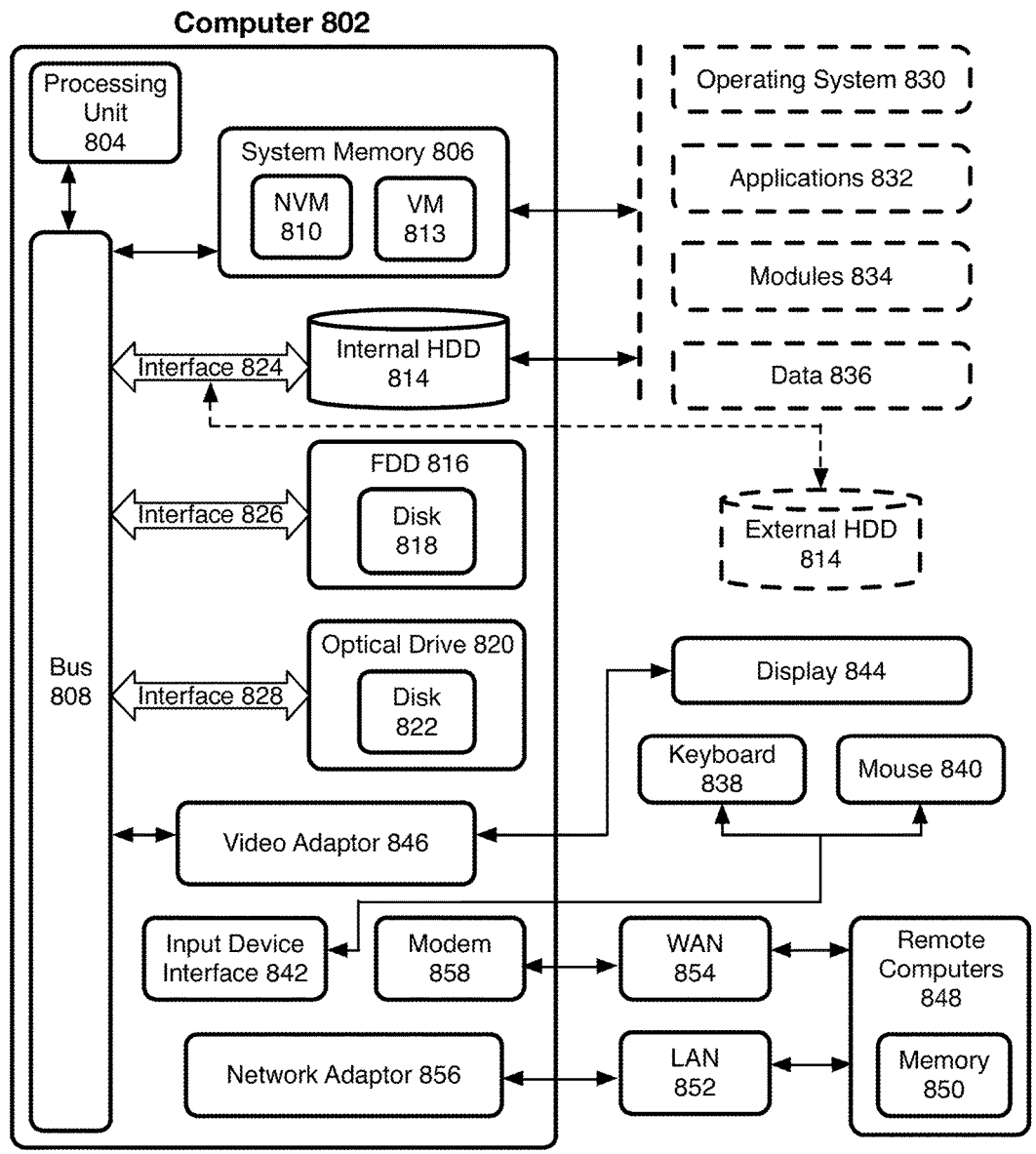
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device, such as computer 802. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 813. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM, DVD, or Blu-ray). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 813, including an operating system 830, one or more application programs 832, other program modules 834, and program data 836. In one embodiment, the one or more application programs 832, other program modules 834, and program data 836 can include, for example, the various applications and/or components to implement the disclosed embodiments.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A display 844 is also connected to the system bus 808 via an interface, such as a video adaptor 846. The display 844 may be internal or external to the computer 802. In addition to the display 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
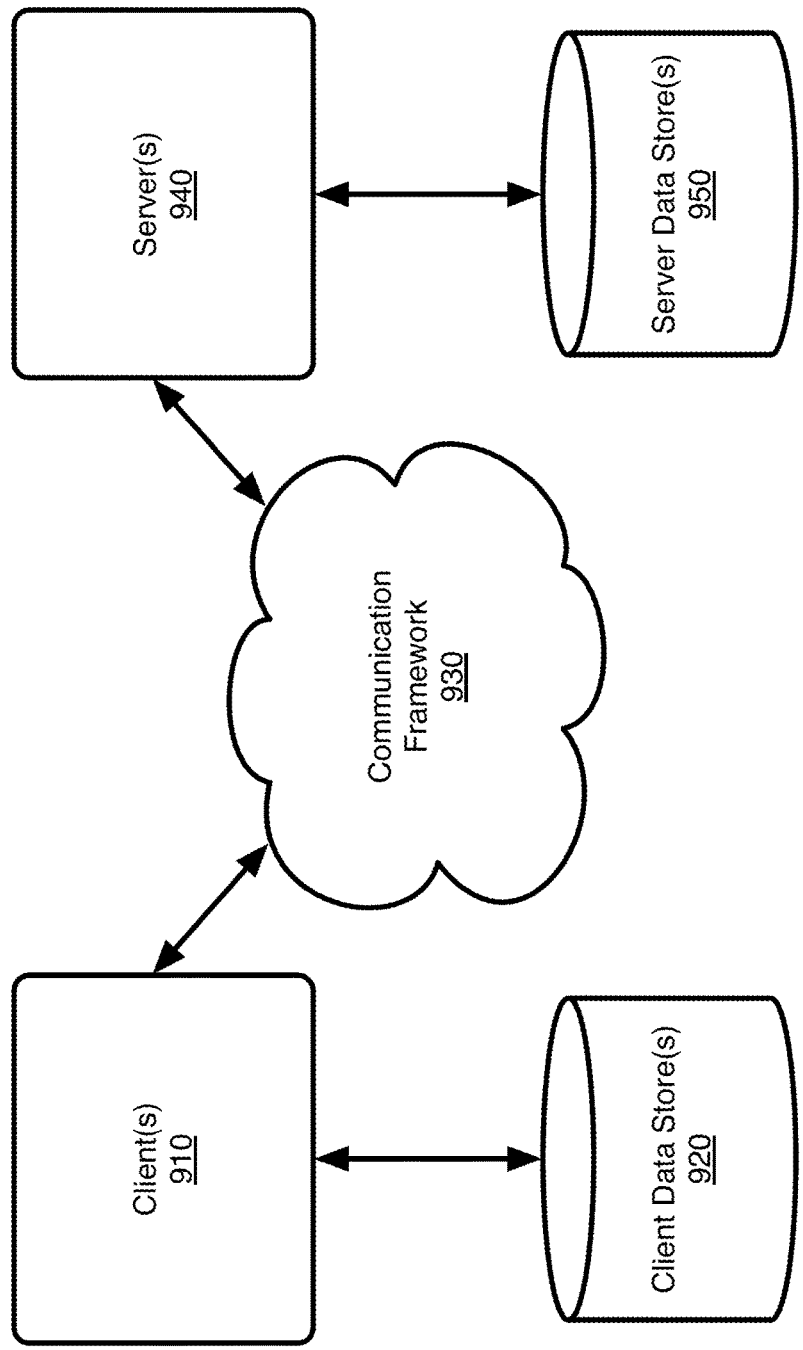
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 910 and servers 940. The clients 910 may implement the client device 710. The servers 940 may implement the server device 740. The clients 910 and the servers 940 are operatively connected to one or more respective client data stores 920 and server data stores 950 that can be employed to store information local to the respective clients 910 and servers 940, such as cookies and/or associated contextual information.

The clients 910 and the servers 940 may communicate information between each other using a communication framework 930. The communications framework 930 may implement any well-known communications techniques and protocols. The communications framework 930 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 930 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 910 and the servers 940. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
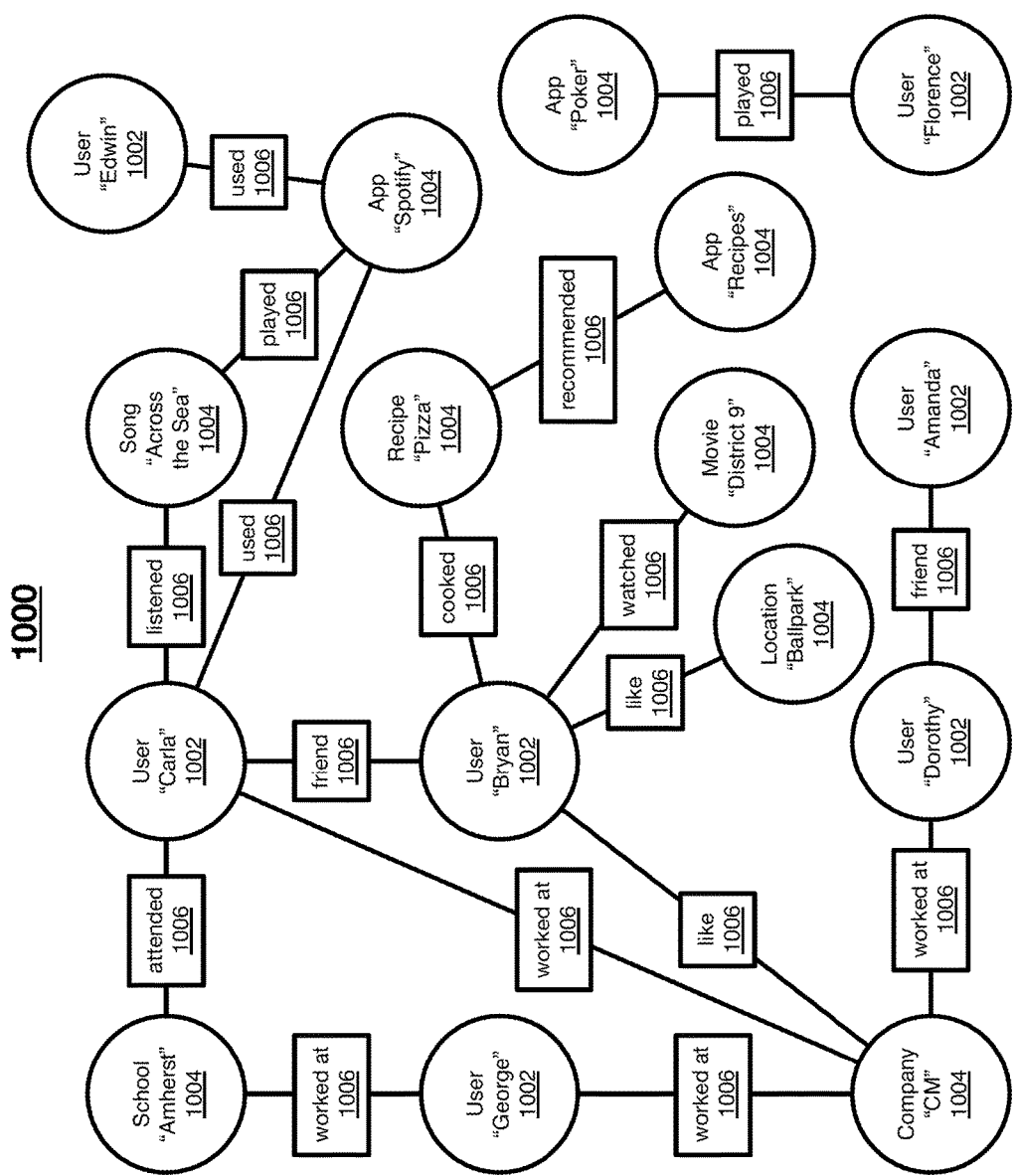
FIG. 10 illustrates an embodiment of a social graph.

FIG. 10 illustrates an example of a social graph 1000. In one or more of the embodiments described herein, a social graph may be accessed and data therefrom may be preloaded into a device, or accessed using user information preloaded into a device. In particular embodiments, a social-networking service may store one or more social graphs 1000 in one or more data stores. In particular embodiments, social graph 1000 may include multiple nodes, which may include multiple user nodes 1002 and multiple concept nodes 1004. Social graph 1000 may include multiple edges 1006 connecting the nodes. In particular embodiments, a social-networking service, client system, third-party system, or any other system or device may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of the social-networking service. As an example and not by way of limitation, a user may be an individual (human user), an entity (e.g., an enterprise, business, or third-party application), or a group (e.g., of individuals or entities) that interacts or communicates with or over the social-networking service. In particular embodiments, when a user registers for an account with the social-networking service, the social-networking service may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with the social-networking service. In particular embodiments, a user node 1002 may be associated with information provided by a user or information gathered by various systems, including the social-networking service. As an example and not by way of limitation, a user may provide their name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including the social-networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number, SIM information as described above, or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to the social-networking service. Profile pages may also be hosted on third-party websites associated with a third-party server. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking service a message indicating the user's action. In response to the message, the social-networking service may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, the social-networking service may send a "friend request" to the second user. If the second user confirms the "friend request," the social-networking service may create an edge 1006 connecting the first user's user node 1002 to the second user's user node 1002 in social graph 1000 and store edge 1006 as social-graph information in one or more data stores. In the example of FIG. 10, social graph 1000 includes an edge 1006 indicating a friend relation between user nodes 1002 of user "Amanda" and user "Bryan" and an edge indicating a friend relation between user nodes 1002 of user "Carla" and user "Bryan." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, the social-networking service may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking service may create a "listened" edge 1006 and a "used" edge (as illustrated in FIG. 9) between user nodes 1002 corresponding to the user and concept nodes 1004 corresponding to the song and application to indicate that the user listened to the song and used the application. Moreover, the social-networking service may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Across the Sea"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "Edwin" and concept node 1004 for "SPOTIFY").

In particular embodiments, the social-networking service may create an edge 1006 between a user node 1002 and a concept node 1004 in social graph 1000. As an example and not by way of limitation, a user viewing a concept-profile page (such as, for example, by using a web browser or a special-purpose application hosted by the user's client system) may indicate that he or she likes the concept represented by the concept node 1004 by clicking or selecting a "Like" icon, which may cause the user's client system to send to the social-networking service a message indicating the user's liking of the concept associated with the concept-profile page. In response to the message, the social-networking service may create an edge 1006 between user node 1002 associated with the user and concept node 1004, as illustrated by "like" edge 1006 between the user and concept node 1004. In particular embodiments, the social-networking service may store an edge 1006 in one or more data stores. In particular embodiments, an edge 1006 may be automatically formed by the social-networking service in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. A computer-implemented method, comprising:
transmitting user credentials to a mobile device kiosk, the user credentials comprising authentication information for authenticating a user with a remote authentication server associated with user data for personalizing a mobile device;
receiving, from the mobile device kiosk, the user data associated with the user credentials, the user data received by a wireless transmitter embedded of the mobile device, the wireless transmitter configured to receive the user data regardless of a power state of the mobile device and to communicate the received user data to a non-volatile memory of the mobile device; and
personalizing the mobile device based on the user data, wherein personalizing the mobile device comprises pre-loading payment data associated with the user, populating login data for the user for a social network, loading photos of the user onto the mobile device, loading contact information onto the mobile device, provisioning virtual subscriber identity module (VSIM) data to the mobile device, or populating a browser of the mobile device with browsing preferences, bookmarks, or advertising data for the user.

2. The computer implemented method of claim 1, the user data being transferred to the mobile device without powering on the mobile device.

3. The computer-implemented method of claim 1, the user data including an initialization flag used to instruct the mobile device to populate a memory of the mobile device with user profile information upon powering on the mobile device.

4. The computer-implemented method of claim 1, the wireless transmitter comprising a radio frequency identifier (RFID) module.

5. The computer-implemented method of claim 4, the RFID module configured to communicate with the non-volatile memory over an inter-integrated circuit (I2C) bus.

6. The computer-implemented method of claim 1, wherein the user credentials are for a social networking service.

7. The computer-implemented method of claim 1, wherein the user credentials are for a mobile carrier service.

8. A mobile device comprising:
a processing unit; and
a printed circuit board (PCB) including:
a wireless transmitter unit configured to:
transmit user credentials to a mobile device kiosk, the user credentials comprising authentication information for authenticating a user with a remote authentication server associated with user data for personalizing a mobile device, and
receive, from the mobile device kiosk, the user data associated with the user credentials, the user data received by a wireless transmitter embedded of the mobile device, the wireless transmitter configured to receive the user data regardless of a power state of the mobile device;
non-volatile memory configured to communicate with the wireless transmitter unit to receive the user data and to be personalized by one or more of: pre-loading payment data associated with the user, populating login data for the user for a social network, loading photos of the user onto the mobile device, loading contact information onto the mobile device, provisioning virtual subscriber identity module (VSIM) data to the mobile device, or populating a browser of the mobile device with browsing preferences, bookmarks, or advertising data for the user.

9. The mobile device of claim 8, the user data being transferred to the mobile device without powering on the mobile device.

10. The mobile device of claim 8, the user data including an initialization flag used to instruct the mobile device to populate a memory of the mobile device with user profile information upon powering on the mobile device.

11. The mobile device of claim 8, the wireless transmitter comprising a radio frequency identifier (RFID) module.

12. The mobile device of claim 11, the RFID module configured to communicate with the non-volatile memory over an inter-integrated circuit (I2C) bus.

13. The mobile device of claim 8, wherein the user credentials are for a social networking service.

14. The mobile device of claim 8, wherein the user credentials are for a mobile carrier service.

15. A non-transitory computer readable medium storing instructions that, when executed, cause one or more processors to:
transmit user credentials to a mobile device kiosk, the user credentials comprising authentication information for authenticating a user with a remote authentication server associated with user data for personalizing a mobile device;
receive, from the mobile device kiosk, the user data associated with the user credentials, the user data received by a wireless transmitter embedded of the mobile device, the wireless transmitter configured to receive the user data regardless of a power state of the mobile device and to communicate the received user data to a non-volatile memory of the mobile device; and
personalize the mobile device based on the user data, wherein personalizing the mobile device comprises pre-loading payment data associated with the user, populating login data for the user for a social network, loading photos of the user onto the mobile device, loading contact information onto the mobile device, provisioning virtual subscriber identity module (VSIM) data to the mobile device, or populating a browser of the mobile device with browsing preferences, bookmarks, or advertising data for the user.

16. The medium of claim 15, the user data being transferred to the mobile device without powering on the mobile device.

17. The medium of claim 15, the user data including an initialization flag used to instruct the mobile device to populate a memory of the mobile device with user profile information upon powering on the mobile device.

18. The medium of claim 15, the wireless transmitter comprising a radio frequency identifier (RFID) module configured to communicate with the non-volatile memory over an inter-integrated circuit (I2C) bus.

19. The medium of claim 15, wherein the user credentials are for a social networking service.

20. The medium of claim 15, wherein the user credentials are for a mobile carrier service.

* * * * *